April 10, 1951 G. A. MORTON ET AL 2,548,118
ART OF ANALYZING OPTICAL IMAGES
Filed May 1, 1950 2 Sheets-Sheet 1
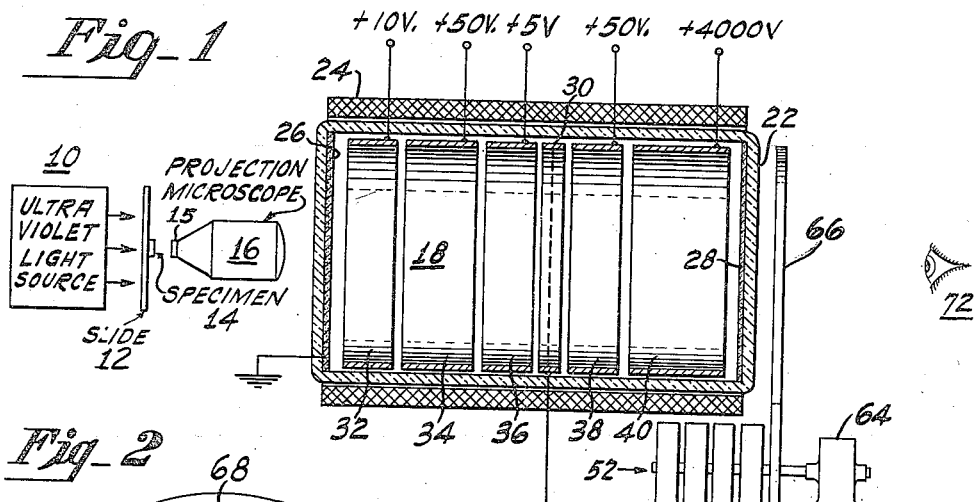
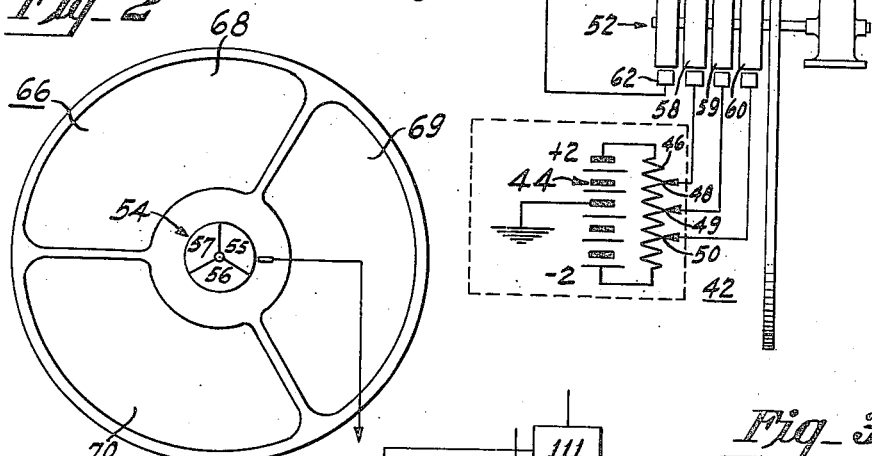
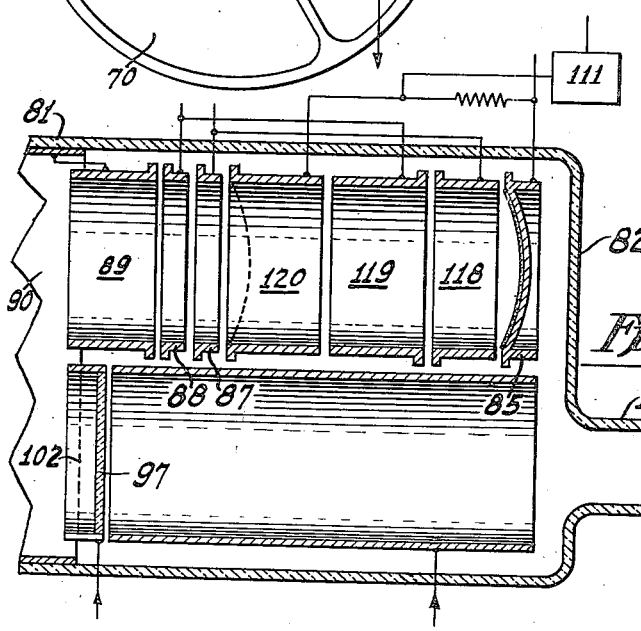
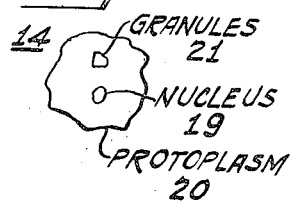
INVENTORS
GEORGE A. MORTON &
GARDNER L. KREIGER
BY
Roderick Malcolm
ATTORNEY April 10, 1951     G. A. MORTON ET AL     2,548,118
ART OF ANALYZING OPTICAL IMAGES Filed May 1, 1950     2 Sheets-Sheet 2

INVENTORS
GEORGE A. MORTON &
GARDNER L. KREIGER
BY Roderick Malcolm
ATTORNEY

Patented Apr. 10, 1951

2,548,118

UNITED STATES PATENT OFFICE 2,548,118

ART OF ANALYZING OPTICAL IMAGES

George A. Morton and Gardner L. Krieger, Princeton, N. J., assignors to Radio Corporation of America, a corporation of Delaware Application May 1, 1950, Serial No. 159,356

7 Claims. (Cl. 313—65)

This invention relates to the art of converting an optical image into discrete electron images representing components of the object light in different portions of the light spectrum.

In the prior art of color-analyzing objects, it has been customary to use optical filtering. For example, in color television systems, two, three, or even more optical filters may be used either with a single pickup tube or with an equal number thereof. The filters are usually mounted on a revolving disk in single pickup tube cameras. Otherwise, they are usually employed in arrangements of half-silvered mirrors in cameras having several such tubes. For certain purposes it is desirable to attain color separation without reliance on optical filters. One purpose is to avoid the reduced sensitivity caused by their absorption of light. Another is to simplify the color analyzing device to reduce its cost.

It is an object of the present invention to provide a light-responsive discharge device capable of color-analyzing an object without reliance on optical filtering.

It is another object to provide a pickup tube which, without the use of optical filtering at its input, is capable of producing a number of respective charge images representing the components of an object which are constituted of light in different portions of the light spectrum.

It is a further object to provide an image tube which, without the use of optical filtering at its input, is capable of producing respective fluorescent images representing different components of an object.

It is a further object to provide a pickup device which, without the use of optical filtering at its input, is capable of translating an object constituted of light in a number of portions of the spectrum in which the light is invisible, into a visible image constituted of light in an equal number of discrete portions of the light spectrum predetermined to correspond therewith.

It is a further object to provide a pickup tube which, without the use of optical filtering, is capable of producing a number of respective charge images representing different components of a full color object and to translate each of said images into a separate video signal.

In general, the above objects are attained by providing means for separating an electron-image emitted from the photo-cathode of a pickup tube into component images constituted of electrons having different ranges of initial velocity. As a result, each component image corresponds to a respective component of the object which is constituted of light in a different portion of the light spectrum. This is due to the fact that photo-electrons excited by light of different wavelengths are emitted in different velocity ranges.

The separation of the electron image is accomplished by "velocity filtering." In one way of velocity filtering, the means employed is a fine mesh grid. All of the electrons are projected toward this grid in the direction of a target but only those above a certain velocity will get through. The potential of the grid with respect to the photo-cathode determines how much of the electron image is passed through and how much is reflected back. In this kind of separation, the electrons which reach the target either are a group of only the fastest ones or some larger group which includes them. In another way of velocity filtering, the means employed is an electron mirror. All of the electron-image is projected toward the mirror. Those below a certain velocity are reflected away from the mirror and usefully projected onto the target while all of the rest are collected on the mirror and effectively lost. The potential of the mirror with respect to the cathode determines how much of the image is reflected toward a target and how much is collected. In this kind of separation, the electrons which reach the target either are the slowest ones or include them. In still another way of velocity filtering, the means employed is a combination of a grid and a reflector. The grid eliminates as much of the low velocity portion of the original electron image as is desired, passing the rest from a first region of the tube to a second, and a reflector eliminates as much of the high velocity portion of the already once-filtered image as is desired, reflecting the rest from said second region to a third region containing the target. By different combinations of two respective potentials on the grid and reflectors, it is possible to cause the target to receive only a fast group or only a slow group or only an intermediate group, this achieving separation of the original image into three mutually exclusive components. Since each of the two particular potentials in any combination may have any of a very large number of possible values, a fast, or slow, or intermediate group may have its boundaries positioned at any desired points in the entire range of the initial velocities of the image electrons. Therefore, it is possible to achieve separation of the original image into any desired number of mutually exclusive components.

In one form of the invention, the target is a fluorescent screen, so that each component electron image is translated into a corresponding visible image. The screen may be viewed through a color filter disk which is rotated in synchronism with switching of control potentials on the velocity filter(s), so that a virtual polychromatic image is presented to the viewer.

In another form, the target is a surface only which the several component electron-images are sequentially directed to produce corresponding charge images each of which remains on said surface long enough to be analyzed by a scanning electron beam whereby a multiplexed video signal is produced. If the filtering is done in electron velocity ranges corresponding to light wavelengths in the visible portion of the spectrum, this pickup tube may be used in a color television system to produce a video signal representing a full color object.

In the drawing:

Fig. 1 illustrates one embodiment of the invention, and shows how it may be used to present a visible polychromatic image of a specimen which is being enlarged by ultraviolet microscopy;

Fig. 2 shows a view of one side of a color disk which appears edgewise in Fig. 1;

Fig. 3 is a black-and-white representation of a polychromatic image presented by the apparatus shown in Fig. 1;

Fig. 5 shows a modified arrangement for part of the structure of the pickup tube shown in Fig. 4.

Figure 4:
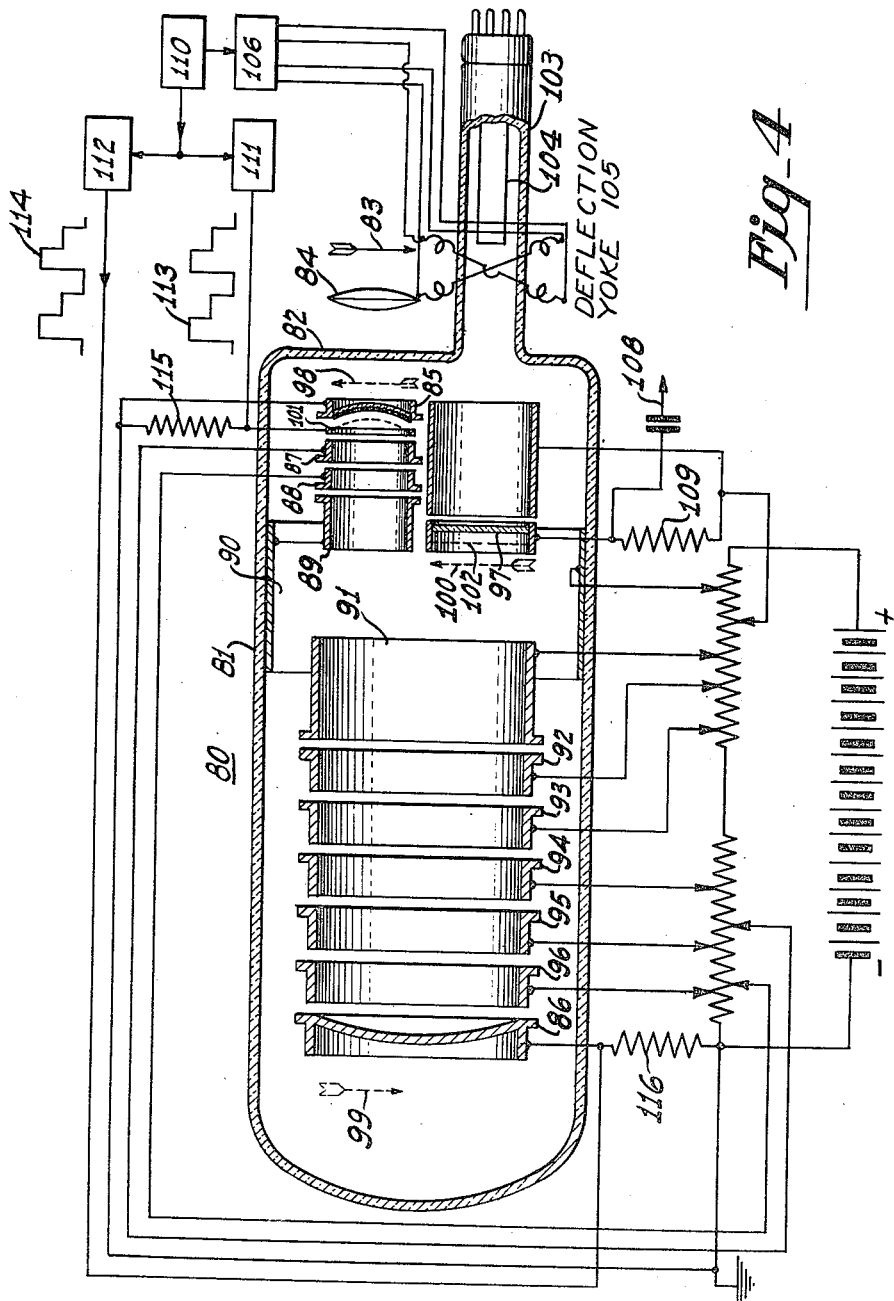
Fig. 4 shows another embodiment of the invention capable of producing a multiplexed color video signal.

Fig. 1 shows an apparatus for microscopically studying specimens of such small size that their illumination with visible light does not result in satisfactory resolution. Accordingly, the illuminating light is in the ultraviolet portion of the spectrum, where the wavelengths are shortest. A source of ultraviolet light is represented at 10. Light from source 10 passes through a microscope slide 12 and a specimen 14 into the objective lens 15 of a microscope 16. Since the enlarged ultraviolet image produced by the microscope 16 is constituted of invisible light, an image-converter tube 18 is provided for translating it into a visible image. The particular image-converter tube shown herein has the added advantage of being able to produce different visible images for components of the ultraviolet image which are constituted of light in different portions of the ultraviolet region of the spectrum. As is known, different parts of a specimen, such as the nucleus 19 (Fig. 3) of a cell, its protoplasm 20, and various "granules" 21 occurring therein, are frequently selectively transmissive to ultraviolet light in different wavelength bands. Accordingly, different parts will be discernible in the visible image produced by the tube 18 if the specimen 14 is flooded with ultraviolet light extending over a considerable portion of the ultraviolet region and the tube 18 is operated to respond selectively to different components of the ultraviolet image.

Tube 18 is of the magnetic focus type. To this end, its envelope 22 is cylindrical in shape and is surrounded by an electromagnet 24 wound to produce an axial field extending between and beyond both ends of the envelope. On the inside of the end of envelope 22 nearest to the microscope 16 there is a photo-cathode 26. This cathode, of course, is responsive to ultraviolet wavelengths and the end of the envelope on which it is formed is transmissive thereto. On the inside of the opposite end there is a fluorescent screen 28. A velocity filter grid 30 is positioned between the photo-cathode 26 and the screen 28 in a plane substantially normal to the tube axis. Three cylindrical electrodes, 32, 34 and 36 are mounted in the order named between the photo-cathode 26 and the grid 30.

In the operation of the tube the electrodes 32, 34 are polarized at ascending potentials to accelerate the electrons from cathode 26 toward the screen 28. However, the electrode 36 is maintained at close to the photo-cathode potential and therefore decelerates the electrons so that they approach the grid 30 at only slightly above their initial velocities. The small potential difference between electrode 36 and grid 30 reduces (to a negligible value) any fine structure lens effects which tend to be produced at the mesh apertures. Suitable potentials for accomplishing this acceleration and deceleration are: +10 volts for electrode 32; +50 volts for electrode 34 and +5 volts for electrode 36, all with respect to the photo-cathode.

Another way of obtaining velocity filtering in a region where the electrons have a low average velocity, i. e., a way other than by first accelerating and then decelerating them, is to position the filtering grid closely adjacent to the photo-cathode (as in the embodiment shown in Fig. 4, later described). However, this has a tendency to reduce sensitivity by lowering photo-emission, whereas in the Fig. 1 arrangement, photo-emission is saturated.

Beyond the grid 30, there are two ring electrodes 38 and 40 for re-accelerating the electrons. In the operation of the tube, these electrodes are polarized at ascending potentials such as +50 volts and +4000 volts, the latter being chosen to provide a sufficiently high level of excitation for the screen 28.

A source of three adjustable filtering potentials is shown at 42. Here the source 42 consists of a battery 44 grounded at a point intermediate its positive and negative terminals and shunted by a voltage divider 46 having three taps 48, 49 and 50. A rotating switch 52 consists of a commutator 54 having three segments, 55, 56 and 57 (see Fig. 2) which are respectively connected to three slip rings 58, 59 and 60. Each of the taps 48, 49 and 50 is electrically connected to one of the slip rings by an individual sliding contact and the grid 30 is electrically connected to the commutator 54 over a brush 62. As a result, three different adjustable potentials obtainable from the source 42 may be individually applied to the grid 30 over the switch 52.

If desired, this switch may be manually set so that any one of three different fluorescent images (each representing an enlarged image of the specimen constituted of ultraviolet light in a different spectral range) may be observed independently of the others. However, it is also possible to produce these three images in sequence at such a rate that they appear as a composite image to a viewer. To this end, the switch 52 is mounted on the shaft of a motor 64. A filter disk 66 is mounted on the same shaft. Its surface is divided into three segments, 68, 69 and 70, each constituted of a Wratten filter which transmits light of a different color, such as red, green or blue. The angular orientation of the disk 66 with respect to the commutator 54 is such that a different segment 68, 69 or 70 will be in the line of sight between the screen 28 and an observer at 72 while each of the potentials from the source 42 is being applied to the grid 30. As a result, the composite visible image will appear to the viewer like an enlargement of the specimen with various ones of its parts differently colored to emphasize the demarcations between them.

In the simple velocity filtering arrangement shown in Fig. 1, the electron image is not separated into mutually exclusive components. The most negative of three control potentials for the grid 30 does permit only the highest velocity electrons to pass through the grid. However, the intermediate control potential not only permits electrons in an intermediate range of velocities to pass through but also all of the highest velocity electrons as well. And, similarly, the most positive control potential permits all of the electrons to pass through. Thus, the three fluorescent images may correspond to ultraviolet images (produced by microscope 16) when the specimen 14 is flooded with light in the respective ranges of wavelengths from 2500–3000, 2500–3500, and 2500–4000 angstrom units. Even though the fluorescent images provided by this particular arrangement do not represent mutually exclusive components of the ultraviolet image, nevertheless the composite image will afford sharp demarcations between various parts of the specimen under study.

The pickup tube 80 shown in Fig. 4 is capable of separating an electron image into three mutually exclusive components, each representing a different component of the polychromatic object. For this reason, this tube is more suitable to use in a color television system than a tube of the kind shown in Fig. 1.

The envelope 81 of the tube 80 comprises a window 82 through which light from an object 83 may be projected by a suitable optical system 84 upon a photo-cathode 85. In the operation of tube 80, an electron-image produced on the photo-cathode 85 is projected toward an electron mirror 86 by a system of electrodes 87, 88, 89, 90, 91, 92, 93, 94, 95, and 96. The particular arrangement of this system of electrodes is not a part of the present invention and may be in accordance with the prior art, for example, as shown in U. S. Patent 2,222,181. The reflector 86 retards the electron-image and, depending on what control potential is applied to it, reflects at least part of the image towards a target 97. In its passage through the system of electrodes employed herein, an electron image will be preserved intact during its two-directional trip between the photo-cathode and the target by electrostatic (instead of electromagnetic) focusing. The dotted arrows 98, 99, 100 which appear in Fig. 4 indicate a number of image inversions which occur in this electron optical system. The tube 80 comprises two velocity filters. A first velocity filter 101 of the grid type is located closely adjacent to the emissive side of the photo-cathode 85, i. e., in the first low-velocity region of the path of travel of the electrons. The grid 101 has the same center of curvature as the cathode 85 so that any field between them will be uniform.

In the operation of tube 80, any portion of a primary electron image which is not reflected from the reflector 86 are simply collected on it. Moreover, the electrons comprising this portion strike the reflector far below the first "cross-over" point of the electron-velocity versus secondary-emission-ratio curve and therefore the number of secondary electrons which are emitted is negligible.

The target 97 is a surface on which a charge image is formed in response to the arrival of the electron image reflected to it from the reflector 86. If desired, means can be provided for retarding the reflected electrons so that they are deposited on the front surface of the target 97 as a negative charge image. However, in the example shown in Fig. 4, a positive charge image is formed by projecting the primary electron-image against the target 97 at a velocity above the first cross-over point so that secondary electrons are emitted from the target. Accordingly, the tube 80 comprises a fine mesh collector grid 102 which is carried closely adjacent to and insulated from the bombarded surface of the target 97. The target 97 may be similar to a type of thin glass target used in image-orthicon pickup tubes, i. e., comprising a membrane of glass of the order of one-half mil thick and of such composition that for this thickness it is fairly conductive between its surfaces but is substantially non-conductive between adjacent picture-element portions of its bombarded surface. The collector grid 102 should be near enough to the target 97 so that the grid can function in the manner of a backing plate as a signal take-off electrode.

An extension of the envelope 81 extends from the target 97, in a rightward direction in the drawing, to provide a neck 103. An electron gun 104 located inside the neck 103 is trained on the target 97. In the use of the tube 80, a deflection yoke 105 is placed over the neck 103 and energized from a suitable deflection current source 106 to scan the back surface of the target 97 with a beam of electrons from gun 104. The scanning beam causes small impulses of current to flow to or from the target 97 in accordance with the intensities of elementary portions of the charge image thereon. These impulses are capacitively coupled to an output circuit 108 over the capacity between the grid 102 and the charge image. A load impedance 109 is connected in series with the high voltage lead to grid 102 to translate the current into a useful video voltage.

Color switching may be at the field scanning rate, the line scanning rate, or even at a very high picture-element ("dot") scanning rate. However, if a desired switching rate is so high that the transit time of the electrons between the two filter means is equal to a substantial part of one color period thereof, it is advantageous to employ a delay or phasing means in the color switching circuit for the reflector 86 so that its action on any given group of electrons will be properly related to the earlier action which the filter grid 101 had on it.

However, for the purpose of illustration only, it may be assumed that color switching is at a relatively low rate, such as at the field scanning rate, for which the electron image transit time can be neglected.

A synchronization circuit 110 provides synchronization pulses to the deflection current generator 106 and to a pair of step-voltage color switching signal generators 111, 112. Circuit 110 may be of any suitable conventional type having, for example, a crystal controlled oscillator and suitable trigger forming circuits. If the most positive-going square waves of the step-waves 113 and 114 are simultaneously applied to the grid 101 and the reflector 86 respectively, the following filtering will result: the grid 101 will pass the entire original electron-image; and the reflector 86 will collect the fastest group and an intermediate group of electrons, reflecting only a slowest group to the target. If the intermediate square waves are applied to the grid and the reflector, the former will stop the slowest group of electrons, passing only the fastest and intermediate groups, and the latter will collect the fastest group, reflecting only the intermediate group to the target. If the most negative-going square waves are applied to the two filter means, the grid will stop the slowest and intermediate groups of electrons, passing only the fastest group and the reflector will collect no electrons, thus reflecting this (fastest) group to the target 97.

As shown in Fig. 4, the grid 101 and the reflector 86 are prevented from being grounded through the power supply by being respectively connected thereto over resistors 115 and 116, thus avoiding excessive loading of the generators 111 and 112.

Fig. 5 shows a modified arrangement for a part of the tube shown in Fig. 4. In this arrangement, the first filter means is located at some distance from the cathode 85 so as not to affect photo-emission. Because of this, additional electrodes 118 and 119 are employed for producing at grid 120 a low-velocity image of the photo-electron image. Electrodes 118 and 119 are employed for respectively accelerating the photo-electron image, to draw it away from the cathode and move it toward the filter grid 120, and for decelerating it just before it reaches the grid. In a tube thus modified, the neck 103 and the electron gun 104 are positioned further to the right (in the drawing) to avoid locating the deflection yoke 105 in a region where its fringing flux may interfere with the operation of part of the electron optical system between the photo-cathode 85 and the electrode 90. The result is that the scansion of the beam will be accomplished with smaller angles of deflection and the beam will travel a greater distance between the gun 104 and the target 97. If desired, any possibility of magnetic field interference may be further reduced by the use of magnetic shielding of the sides and front end of the yoke 105. Or if desired, the yoke 105 may be replaced by any suitable known means for electrostatically deflecting the beam.

It is possible to operate a tube 18 of the kind shown in Fig. 1 in such a way as to obtain color separation equal to that obtainable by a tube 80 of the kind shown in Fig. 4. In one way of so operating it, two electron images are stored, one being an image which results from the fact that two or more velocity groups of electrons reach the target and which therefore represent both a desired component and at least one undesired component of the object, and another being an image which represents the undesired component(s); the two stored images are "read" simultaneously; and the video signal secured by the scanning of the latter image is inverted and added to the uninverted video signal. If a tube 18 is used in this way in a color television camera, the blue signal will be obtainable directly (without storage and algebraic addition) since blue light excitation produces the fastest photo-electrons and a filter grid can be operated to pass a group of only the fastest electrons. The red signal may be obtained by storing one electron-image representing the blue-plus-green components and another representing the blue-plus-green-plus-red components (i. e., representing the entire polychromatic picture); scanning these images simultaneously to obtain two video signals; inverting the blue-plus-green signal; and algebraically adding this inverted signal to the uninverted signal.

Suitable apparatus for accomplishing this would be three image-orthicon tubes arranged so that all of them receive light from the fluorescent screen 28 by the use of a system of half-silvered mirrors. An orthicon has sufficiently long storage time to operate in the manner required. The exact nature of the electrical circuits for performing the required simultaneous scannings, video voltage inversions and algebraic additions are not part of the present invention and can be provided by reference to well-known art.

What we claim is:

1. A image tube comprising an evacuated envelope containing a photo-cathode, a target for receiving an electron-image from said cathode, at least one electrode for accelerating electrons from said cathode along a path terminating at said target, and velocity filtering means located at an intermediate position along said path and responsive to polarization at a control potential for preventing electrons within a selected range of initial velocities from reaching said target.

2. An image tube as in claim 1 in which the velocity filtering means is a filter grid positioned closely adjacent to the emissive surface of the photo-cathode.

3. An image tube as in claim 1 in which said filtering means comprises a filter grid extending across said path at a position between said accelerating electrode and said target a decelerating electrode between said grid and said accelerating electrode.

4. An image tube as in claim 1 in which said path extends in one direction over a first leg and in another direction over a second leg and said velocity filtering means is an electrostatic mirror positioned near the juncture of said two legs to reflect toward said target image electrons which approach it from said photo-cathode.

5. An image tube comprising an evacuated envelope containing a photo-cathode, an electrostatic mirror facing said cathode, a target facing said mirror for receiving photo-electrons which originate from said cathode and are reflected in the direction of the target by the mirror, electrodes comprising an electrostatic lens system for conveying toward said mirror electrons emitted from the cathode to focus them thereat into an image of the photo-electron image, electrodes comprising an electrostatic lens system for conveying toward said target electrons reflected from said mirror to focus them thereat into another image of the photo-electron image, and a velocity filtering grid located at an intermediate position along the two-directional path between the cathode and the target and responsive to polarization at a control potential to sufficiently retard electrons which approach it therealong with a certain range of initial velocities so that only those having velocities in a highest portion of said range will pass through to continue toward said target.

6. An image tube as in claim 5 which further comprises an electron gun trained on said target to provide a beam scannable over the surface thereof for translating a charge image thereon into a video signal.

7. A photoelectric device for receiving object light having components extending over a relatively wide range of wave lengths and for analyzing said light as to components thereof in different wave length ranges within said first-mentioned range comprising: a cathode having a photoemissive image area for receiving object light of any wave length within said relatively wide range thereof on any part of said area to produce a composite electron image effectively comprising a number of intermixed electron images each constituted of electrons excited by object light in a respective one of said different wave length ranges and thereby having initial velocities in different respective velocity ranges; means for accelerating electrons of said composite image from said photoemissive area along a predetermined path toward an electron-receiving utilization surface; means for applying a velocity filtering electric field to said last-mentioned electrons as they move along said path to cause primarily only ones thereof which were emitted with initial velocities in a predetermined one of said respective ranges to reach said utilization surface.

GEORGE A. MORTON.
GARDNER L. KRIEGER.

REFERENCES CITED

The following references are of record in the file of this patent:

UNITED STATES PATENTS

| Number | Name | Date |
| --- | --- | --- |
| 2,107,782 | Farnsworth et al. | Feb. 8, 1938 |
| 2,296,908 | Crosby | Sept. 29, 1942 |